US010731750B2

(12) United States Patent  
Wang et al.

(10) Patent No.: US 10,731,750 B2  
(45) Date of Patent: Aug. 4, 2020

(54) MONOSTABLE ROTARY SHIFTER

(71) Applicant: KUSTER NORTH AMERICA, INC., Troy, MI (US)

(72) Inventors: Yong Qiang Wang, Troy, MI (US); Michael Benedetto D'Annunzio, Macomb, MI (US)

(73) Assignee: Kuster North America, Inc., Troy, MI (US)

( * ) Notice: Subject to any disclaimer, the term of this patent is extended or adjusted under 35 U.S.C. 154(b) by 235 days.

(21) Appl. No.: 15/907,903

(22) Filed: Feb. 28, 2018

(65) Prior Publication Data

US 2018/0259063 A1  Sep. 13, 2018

Related U.S. Application Data

(60) Provisional application No. 62/527,438, filed on Jun. 30, 2017, provisional application No. 62/469,311, filed on Mar. 9, 2017.

(51) Int. Cl.
*B60K 20/02* (2006.01)
*F16H 59/02* (2006.01)
(Continued)

(52) U.S. Cl.
CPC .............. *F16H 59/12* (2013.01); *B60K 20/02* (2013.01); *F16H 59/0204* (2013.01);
(Continued)

(58) Field of Classification Search
CPC . B60K 20/02; F16H 59/12; F16H 2059/0282; F16H 2061/0223;
(Continued)

(56) References Cited

U.S. PATENT DOCUMENTS 6,295,887 B1   10/2001 DeJonge et al.
6,564,661 B2 *  5/2003 Dejonge ................ B60K 37/06
                                                74/335

(Continued)

FOREIGN PATENT DOCUMENTS

DE         10304804 A1 *  8/2003  ......... G05G 9/04796
JP       2012040952 A  *  3/2012  ......... G05G 9/04796
(Continued)

*Primary Examiner* — Jake Cook
*Assistant Examiner* — Gregory Robert Weber
(74) *Attorney, Agent, or Firm* — Dinsmore & Shohl LLP

(57) ABSTRACT

A rotary shifter having a housing with a bezel cover. A knob is rotatably secured to the housing and is selectively rotatable between each of Reverse Neutral and Drive positions. A push button is configured within the rotary knob and, upon depressing, communicates with a sensor and switch within the housing for establishing the Park position. In a related variant, a Sport position lock ring is secured to a stem of the knob in a normally biasing engagement with an underside of the bezel cover to prevent shifting to the Sport position, the knob being vertically depressed in a counter direction to the bias in order to vertically unseat the lock ring and to permit subsequent rotation to the Sport position. A Sport position spring can also be provided supporting an underside of the plunger housing locker forming a portion of the plunger housing subassembly.

12 Claims, 9 Drawing Sheets

(51) Int. Cl.
*F16H 59/12* (2006.01)
*F16H 61/22* (2006.01)
*F16H 59/08* (2006.01)

(52) U.S. Cl.
CPC ..... *F16H 61/22* (2013.01); *F16H 2059/0282* (2013.01); *F16H 2059/081* (2013.01); *F16H 2061/223* (2013.01)

(58) Field of Classification Search
CPC ............... F16H 2059/081; F16H 61/22; F16H 59/0204; F16H 2061/233
See application file for complete search history.

(56) References Cited

U.S. PATENT DOCUMENTS

| | | | |
|---|---|---|---|
| 7,028,575 | B2 | 4/2006 | Ehrmaier et al. |
| 7,571,662 | B2 * | 8/2009 | Pickering ............... B60K 37/06 74/473.3 |
| 8,170,757 | B2 | 5/2012 | Furhoff et al. |
| 8,336,424 | B2 | 12/2012 | Miret et al. |
| 9,212,740 | B2 | 12/2015 | Watanabe et al. |
| 9,334,949 | B2 | 5/2016 | Felt et al. |
| 9,410,614 | B2 | 8/2016 | Muraki et al. |
| 9,845,868 | B2 | 12/2017 | Lee et al. |
| 2005/0173232 | A1 * | 8/2005 | Horton ................... H01H 19/11 200/11 R |
| 2006/0037424 | A1 | 2/2006 | Pickering et al. |
| 2009/0107287 | A1 | 4/2009 | Seki |
| 2011/0219901 | A1 | 9/2011 | Giefer et al. |
| 2012/0143409 | A1 | 6/2012 | Curtis et al. |
| 2013/0220055 | A1 | 8/2013 | Curl |
| 2014/0007726 | A1 | 1/2014 | Muraki et al. |
| 2014/0326096 | A1 | 11/2014 | Kim et al. |
| 2014/0345409 | A1 * | 11/2014 | Watanabe ............... F16H 59/08 74/473.3 |
| 2015/0027861 | A1 * | 1/2015 | Hoskins ................. F16H 59/08 200/43.11 |
| 2015/0143938 | A1 | 5/2015 | Swaita et al. |
| 2015/0152958 | A1 | 6/2015 | Watanabe et al. |
| 2015/0159747 | A1 | 6/2015 | Hoskins et al. |
| 2015/0167827 | A1 | 6/2015 | Felt et al. |
| 2015/0369357 | A1 * | 12/2015 | Lee ......................... F16H 59/08 74/504 |
| 2016/0017983 | A1 | 1/2016 | Levesque et al. |
| 2016/0138704 | A1 | 5/2016 | Watanabe et al. |
| 2017/0074391 | A1 * | 3/2017 | Tebbe .................... F16H 59/08 |

FOREIGN PATENT DOCUMENTS

| | | |
|---|---|---|
| WO | 2013123375 A2 | 8/2013 |
| WO | 2017-001006 A1 | 1/2017 |

\* cited by examiner

MONOSTABLE ROTARY SHIFTER

CROSS REFERENCE TO RELATED APPLICATIONS

The present application claims priority from each of U.S. Ser. No. 62/469,311, filed Mar. 9, 2017 and U.S. Ser. No. 62/527,438, filed Jun. 30, 2017.

FIELD OF THE INVENTION

The present invention discloses a rotary shifter having a monostable return to center selection knob which can shift between each of Park, Reverse, Neutral, Drive and Sport positions. The Park position is provided as a central push button configured within the rotary knob which is selectively rotatable to the other positions. Once rotated to one of the RNDS positions and confirmed by LED indication, the knob is automatically returned to the center position by itself. To prevent the shifter from unintentionally shifting into the S gear position, the driver is required to first depress the push knob downwardly in order to shift to the S position. The return to center feature further makes gear selection easier with embedded software in the present design verifying the selected gear position to meet the current vehicle position.

BACKGROUND OF THE RELEVANT ART

The prior art is documented with examples of monostable lever shifters such as which are depicted in the environmental views of FIGS. 1-4. These include general illustrations for each of commercially known lever style shifters associated with existing vehicles including each of a BMW (at 2 in FIG. 1), Land Rover (at 4 in FIG. 2), Mercedes Benz (at 6 in FIG. 3) and Toyota (at 8 in FIG. 4).

Other examples drawn from the prior art include Ehrmaier, U.S. Pat. No. 7,028,575, which teaches a variation of a monostable shifting mechanism in a linear shifting environment and including a shifting element for selecting a plurality of shifting conditions (reverse, neutral, drive) and a step by step shifting condition in which the manual shifting of forward gears takes place. First and second shifting channels are provided for the shifting element, such that the shifting element has a stable position in the first shifting channel and is deflectable to select any one of the shifting conditions and for the manual shifting of the forward gears. Ehrmaier further teaches that the stable position in the first channel is the only stable position of the shifting element which, after being deflected and released, automatically returns to the stable position.

A number of the attached discloses are directed to some form of powered or motorized configuration for establishing a return to park condition. Examples of these include each of the default to park mechanism of Swaita, US 2015/0143938, the rotary gear shifter of Levesque, US 2016/0017983, and the shift device of Watanabe, US 2016/0138704.

A number of additional rotary shifters include push button functionality and include each of Watanabe, US 2014/0345409, in which the knob is rotatable about an axis and movable when pushed in an inward axial direction, Curl, US 2013/0220055, in which the push button switch for selecting from a third group of driving characteristics includes operational states of a power system of the vehicle, and Fett, U.S. Pat. No. 9,334,949, including a central overdrive "S" setting push button.

Other known references teach variations of rotary shifters, some of which include various types of inductive or magnetic (Hall effect) rotary position sensors (see exploded FIG. 3 of Watanabe, US 2014/0345409), notable among these including the rotary control knob assembly of Miret, U.S. Pat. No. 8,336,424, and the shifter selection device of Furhoff, U.S. Pat. No. 8,170,757.

SUMMARY OF THE PRESENT INVENTION

The present invention teaches a rotary shifter having a housing with a bezel cover. A knob is rotatably secured to the housing and is selectively rotatable between each of Reverse Neutral and Drive positions. A push button is configured within the rotary knob and, upon depressing, communicates with a sensor and switch within the housing for establishing the Park position.

In a related variant, a Sport position lock ring is secured to a stem of the knob in a normally biasing engagement with an underside of the bezel cover to prevent shifting to the Sport position, the knob being vertically depressed in a counter direction to the bias in order to vertically unseat the lock ring and to permit subsequent rotation to the Sport position. A Sport position spring can also be provided supporting an underside of the plunger housing locker forming a portion of the plunger housing subassembly.

Additional features include the bezel cover exhibiting an annular opening which receives the rotary knob. An underside of the bezel may further include a plurality of circumferentially arrayed blocking locations proximate the annular opening, with the lock ring further including a plurality of offset projecting tabs in normal biased alignment with the blocking locations.

An inner aperture defining rim is incorporated into a main package defining portion of the housing, the rim further exhibiting a perimeter extending detent profile which is defined by a plurality of inter-connecting and angled surfaces. A cylindrical shaped plunger housing is secured the rotary knob, the plunger housing having a pair of lower and opposite and radial projecting guiding portions, these being interiorly hollowed for receiving a pair of opposing steel balls and supporting detent springs.

The rotary knob further includes an underside collar affixing within an open upper rim interior of the plunger housing which is in turn mounted through the bezel cover opening and a further opening associated with the main package housing so that the radial projecting portions align with the inwardly facing detent profile, the outwardly spring influenced steel balls supported within the open interior of the radial portions interacting in tactile induced fashion with the detent profile edges defined within the inner rim surface of the package housing to establish guided rotation of the knob.

The rotary knob may also include an annular open rim receiving the push button which further includes a generally elongated cylindrical body with an upper end surface aligning generally with the upper knob surface. A knob seal provides support between an underside interface between the rotary knob and a receiving profile of the plunger housing.

A park button seal is provided for communicating the push button with a further park button push rod, thereby enabling collective vertical displacement of the linked Park button and push rod relative to the plunger housing, such that depressing of the push button allows for relative vertical displacement of the push rod in a direction towards an underneath located printed circuit (PCB) board located within the housing. A plurality of conductive pads are secured to an underside of the park position push button such that, upon depressing, the push button and associated push rod, the pads contact the PCB to instruct the generation of the switching signal for the shifter to the Park position.

An underside of the plunger housing further includes a magnet which, upon rotating the plunger housing relative to the main package housing and as guided by the internal detent profile, adjusts a magnetic field sensed by a position sensor within the PCB board in order to detect a rotated knob position. A plurality of light pipes including each of a center Park position light pipe and a separate plurality of further shifter position light pipes are provided, each of the light pipes being arranged within the housing so that bottom open ends are in communication with individual LED's integrated into the PCB board. The individual LED's further can include pairs of LED's for providing each of backlighting and gear indication respectively for each shifter position.

BRIEF DESCRIPTION OF THE DRAWINGS

Reference will now be made to the attached illustrations, when read in combination with the following detailed description, wherein like reference numerals refer to like parts throughout the several views: and in which.

DETAILED DESCRIPTION OF THE PREFERRED EMBODIMENTS

Figure 9:
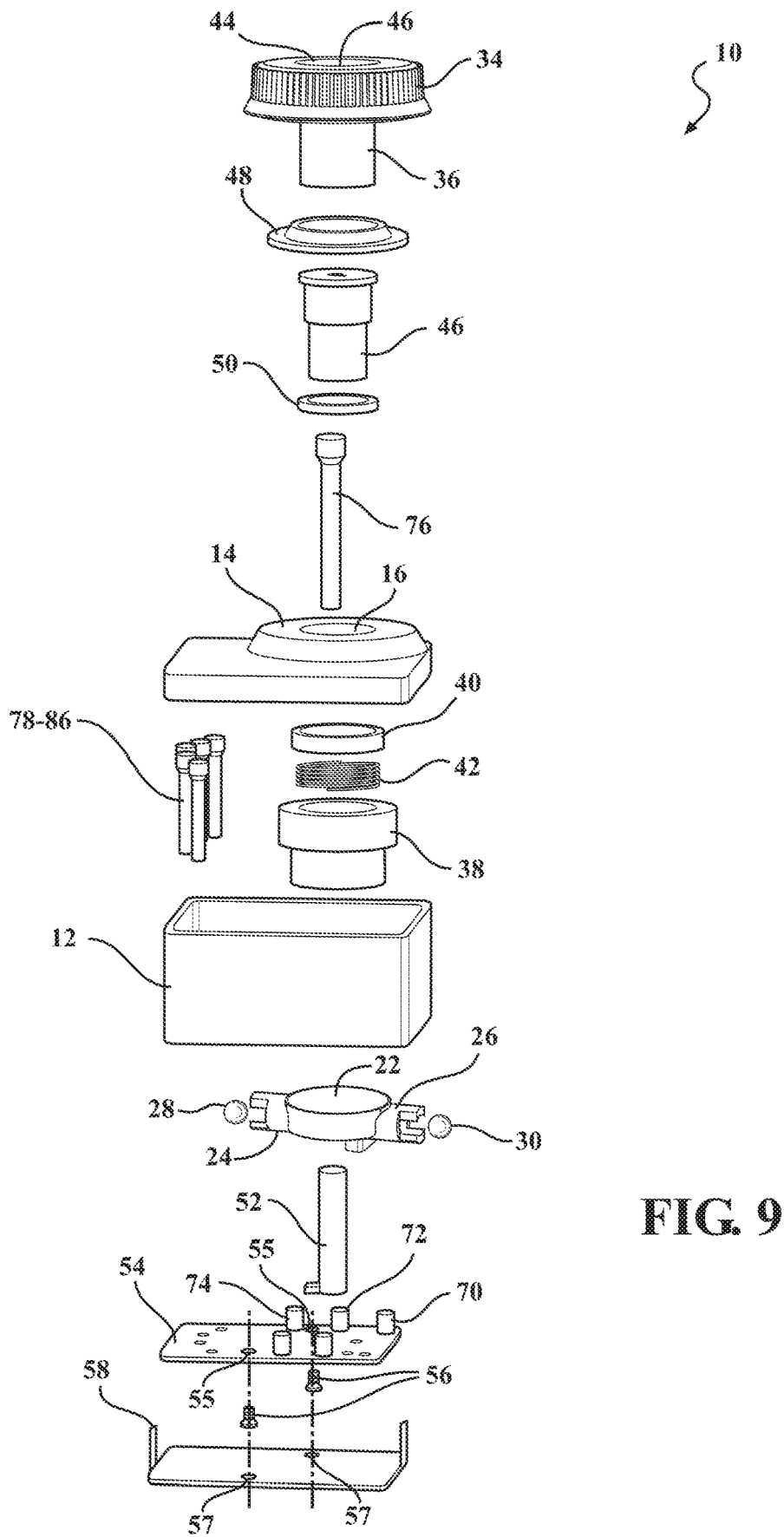
FIG. 9 is an exploded view of the rotary shifter package according to one non-limiting variant of the present invention.
Figure 10:
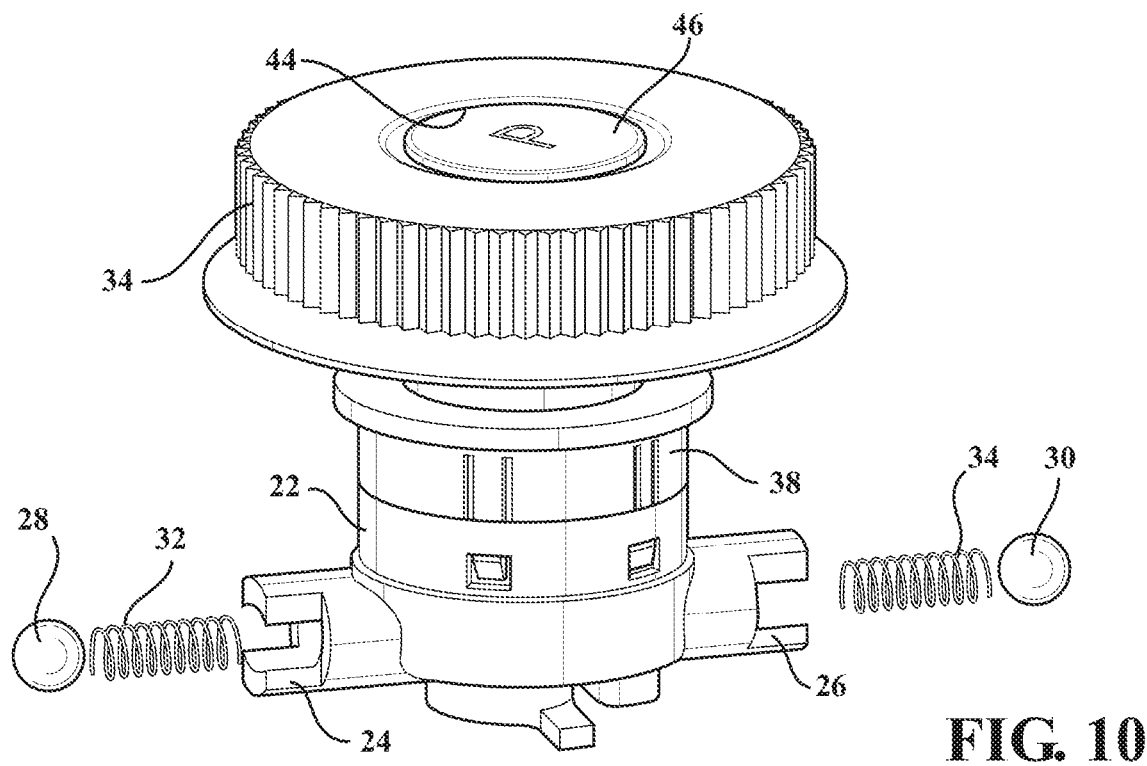
FIG. 10 is an exploded perspective of the rotary knob and plunger housing subassembly.

With reference now to FIGS. 5-17, the present invention discloses a rotary shifter having a monostable return to center selection knob and additional push to rotate feature for shifting the rotary knob to the sport (S) position (such as in lieu of a desired rotation to the drive (D) position). FIG. 9 provides an exploded view of the rotary shifter package, generally at 10, according to one non-limiting variant of the present invention.

The shifter assembly includes a main package defining and three dimensional rectangular shaped housing 12 over which is attached a bezel cover 14. The bezel cover further includes an annular opening (see inner rim 16 in FIG. 9) defined within and which provides a receiving access to the features of the rotary knob subassembly as will be further described.

Figure 11:
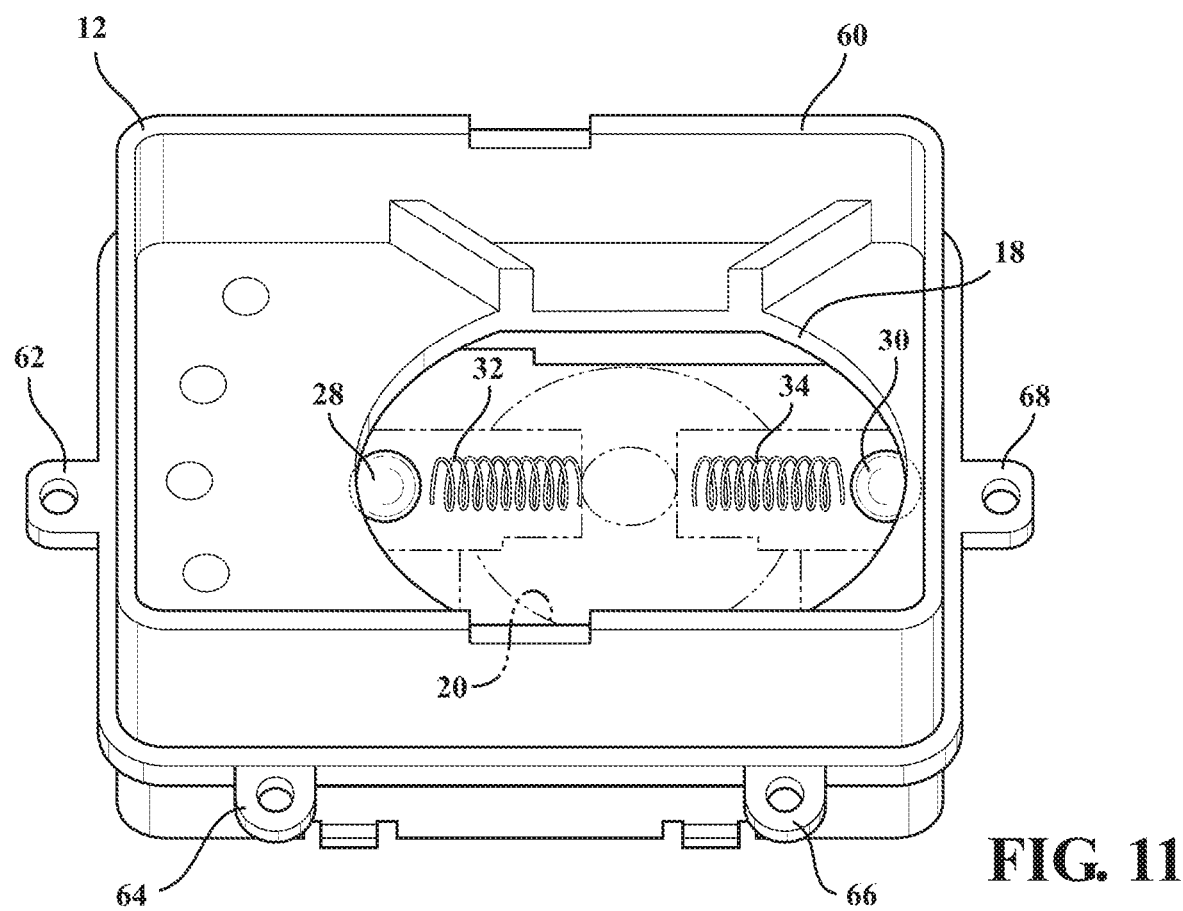
FIG. 11 is an underside assembled view depicting guided rotation between the knob integrated plunger housing and the outer package supporting housing assisted by a pair of opposing steel balls and supporting detent springs which are integrated into opposite radial extending bottom portions which guide the rotation of the knob relative to an opposing and perimeter extending detent profile defined within an inner rim surface of the package housing, the configuration of the detent profile further providing clear tactile/haptic feel of a given shift position and further ensures that the knob will be returned to center at all gear positions.
Figure 12:
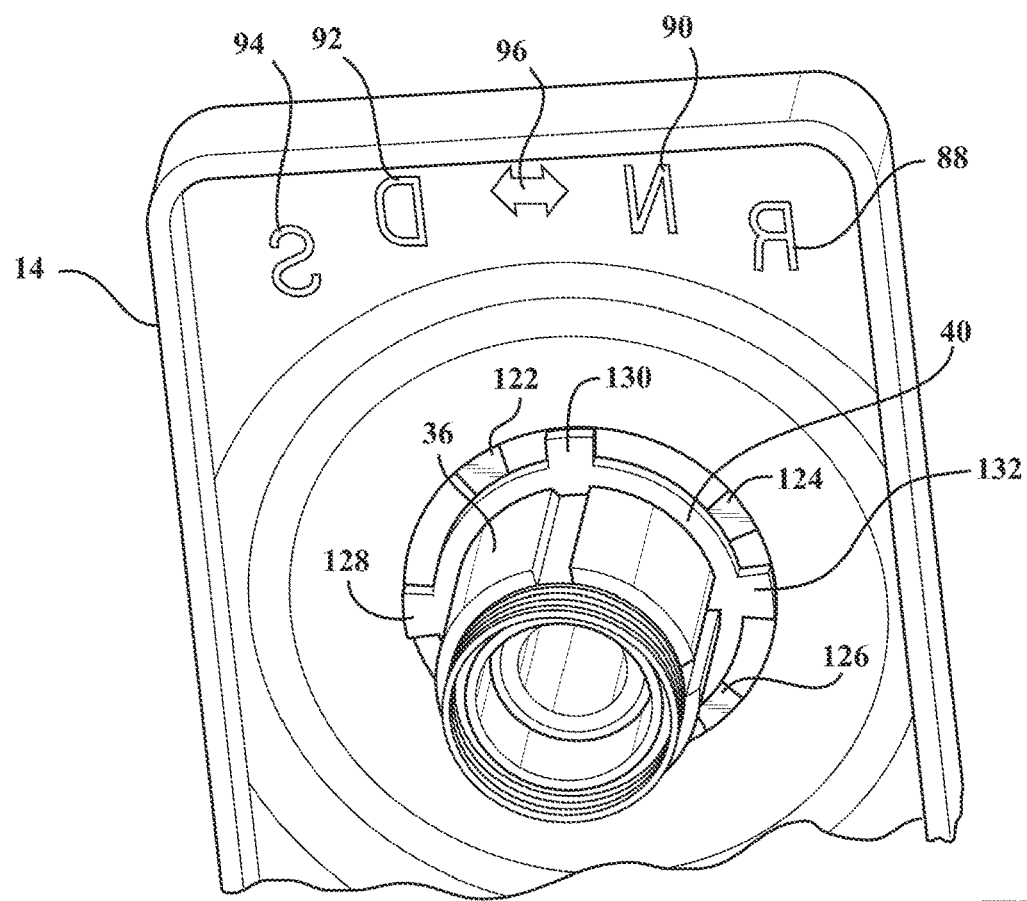
FIG. 12 is a rear rotated perspective of a portion of the rotary shifter assembly including the bezel cover, rotary knob and S position lock ring, the bezel underside exhibiting circumferentially arrayed blocks which prevent rotation of the knob into the S gear without first depressing the knob downwardly.
Figure 13:
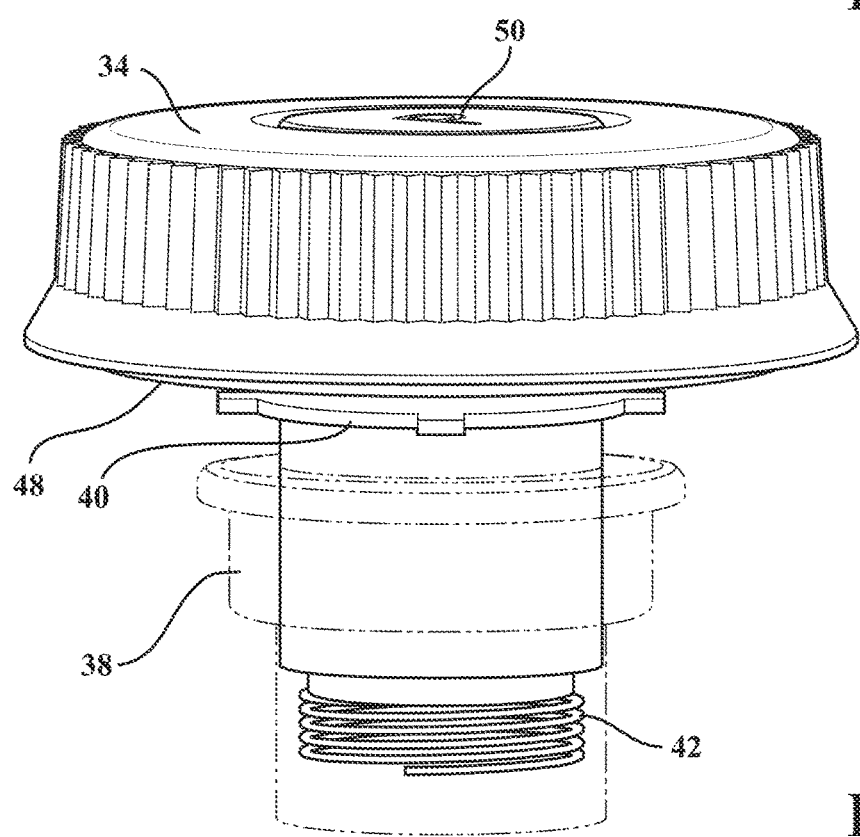
FIG. 13 is a perspective view of a portion of the subassembly and including the rotary knob with S lock ring and depicting a coil spring positioned underneath the plunger housing locker for biasing the knob upwardly to maintain the rotational engagement between the bezel underside blocking locations and the S position lock ring.
Figure 14:
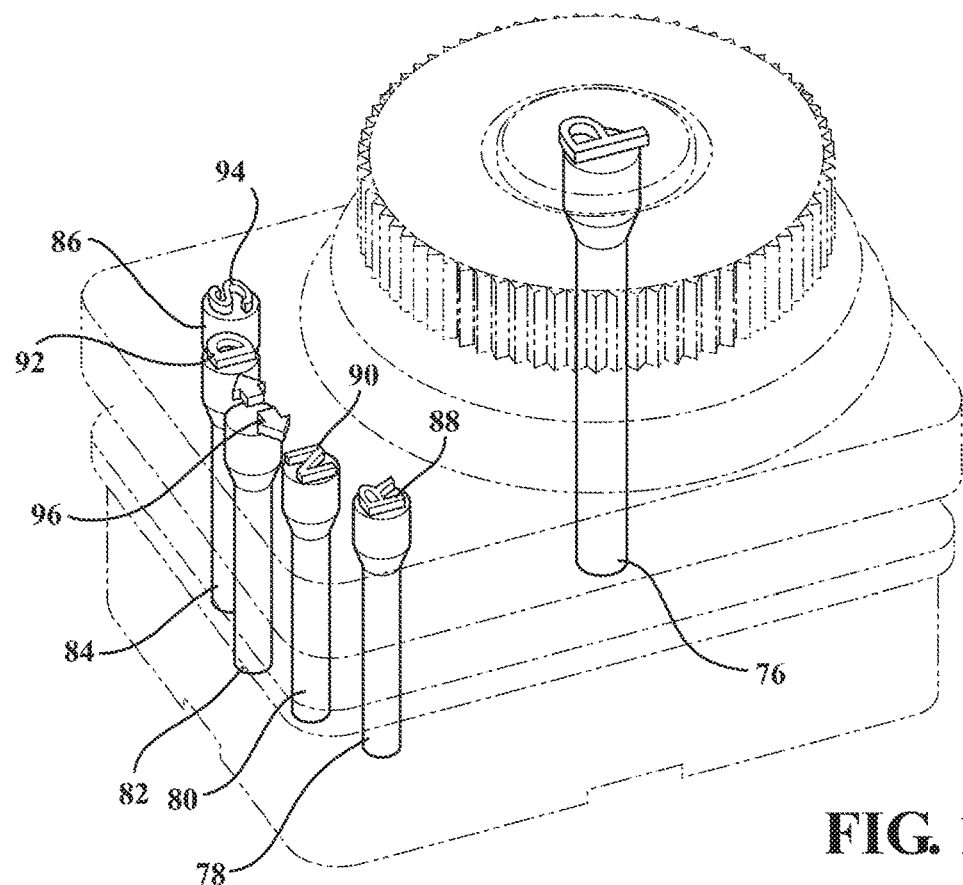
FIG. 14 is a partially transparent perspective illustration of the illuminating and outer packaging components of the monostable rotary shifter including bezel cover, main package housing and arrangement of main Park button light pipe and outer arrayed RNDS light pipes.

As further depicted in the underside perspective of FIG. 11, an inner aperture defining rim incorporated into the main package housing 12 exhibits a perimeter extending detent profile 18 which is defined by a plurality of inter-connecting and angled surfaces. A generally cylindrical shaped plunger housing 22 associated with the rotary knob subassembly is provided and includes a pair of lower and opposite and radial projecting guiding portions 24 and 26, these being interiorly hollowed for receiving a pair of opposing steel balls 28/30 and supporting detent springs 32/34.

A rotary knob 34 includes an underside collar or stem 36 (see FIG. 9) which seats through a subassembly of the plunger housing 22 and an inter-assembled plunger housing locker 38 such that the plunger housing locker extends proximate the underside of the knob 34 and the inner circumference of the plunger housing 22 is coaxially attaches over an opposing exterior circumference of the plunger housing locker 38. A Sport (S) position lock ring 40 and Sport position biasing spring 42 is also depicted in FIG. 9 and, as will be further described in reference to FIGS. 12-13, results in the requirement that the drive first downwardly depress the rotary knob in order to allow rotation of the shifter into the S position.

Upon the bezel cover 14 being mounted atop the main packaging housing 12, and the plunger housing subassembly 22 (with plunger housing locker 38) being mounted through the bezel cover opening 16 and a further opening 20 (FIG. 11) associated with the main package housing 12 (with the knob 34 underside ledge surrounding the collar 36 supported upon the annular rim of the bezel cover 14 surrounding the opening 16), the radial projecting portions 24/26 align with the inwardly facing detent profile 18. The outwardly spring influenced steel balls 28/30 supported within the open interior of the radial portions 24/26 interact in tactile induced fashion with the detent profile edges 18 defined within the inner rim surface of the package housing to establish guided rotation of the knob 34 relative thereto. In this manner, the configuration of the detent profile further provides a clear tactile/haptic feel of a given shift position and, as will be described, further ensures that the knob will be returned to center at all gear positions.

The rotary knob 34 further includes an annular open rim 44 which receives a Park (push) button 46, this further being best depicted in FIG. 9 and including a generally elongated cylindrical body with an upper end surface aligning generally with the upper knob surface. A knob seal 48 (shown in each of FIGS. 9 and 13) provides support between the underside interface between the rotary knob collar 36 and the receiving profile of the plunger housing subassembly 22 and inter-assembled plunger housing locker 38.

A Park button seal 50 (FIG. 9) is provided for communicating the Park button 46 with a further Park button push rod 52, thereby enabling collective vertical displacement of the linked Park button 46 and push rod 52 relative to the plunger housing subassembly 22 and inter-assembled plunger housing locker 38, such that depressing of the P-button 46 allows for relative vertical displacement of the push rod 52 and in a direction towards an underneath located printed circuit (PCB) board 54. As further shown in FIG. 9, the PCB 54 is located at the generally bottom of the package interior, secured by screws 56 extending through apertures 55 in the PCB 54 which mate with aligning aperture 57 defined in a bottom cover 58 supported underneath the PCB 54, this in turn mating with an underside outer rectangular rim edge 60 (FIG. 11) of the main housing 12. The outer package housing 12 can include peripheral mounting tabs or portions (visible examples of which are shown at 62, 64, 66 and 68 in FIG. 11) for mounting the overall assembly within a vehicle environment.

Figure 3:
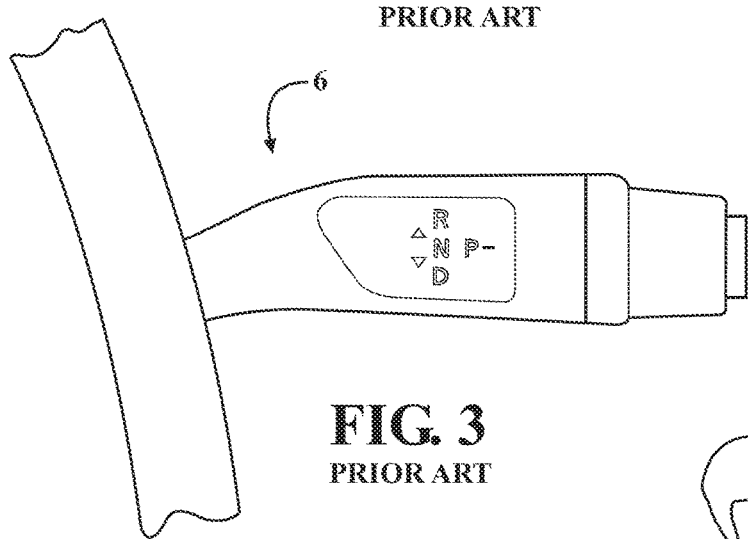
Figure 4:
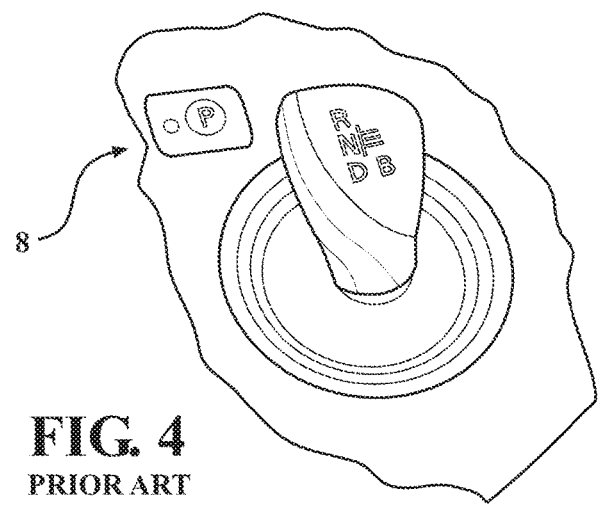

As best shown in FIG. 3, a plurality of conductive pads 70, 72, 74 et seq., are secured to underside locations proximate the plunger housing subassembly 22 such that, upon depressing the Park button 46 (and by connection the Park position push rod 52), the pads contact the PCB 54 to instruct the generation of a switch signal for the shifter to the Park position. An underside of the plunger housing subassembly 22 also integrates a magnet (not shown) which, upon rotating the housing subassembly 22 relative to the main package housing 12 and as guided by the internal detent profile 18, adjusts a magnetic field sensed by a position sensor within the PCB board 54 (such as which is understood further to be any suitable type of inductive or magnetic Hall effect sensor) in order to detect a rotated knob position.

Figure 1:
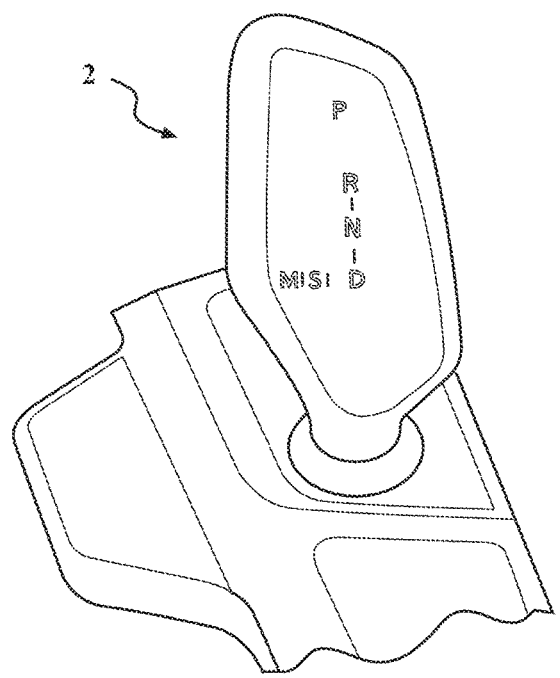
FIGS. 1-4 are illustrations of prior art examples of monostable lever shifters according to the Prior Art.
Figure 2:
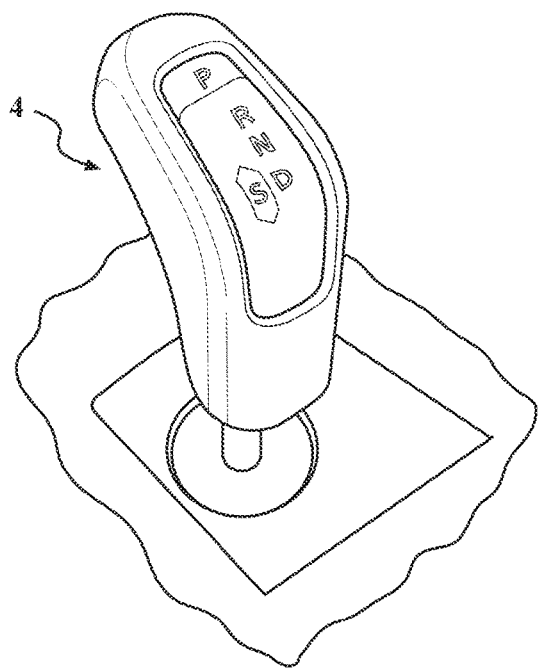

A plurality of light pipes are provided and include each of a center Park position light pipe 76 (FIGS. 3 and 9) and a plurality of RNDS light pipes (see collectively at 78, 80, 82, 84 and 86 in which pipes 78, 80, 84 and 86 correspond to RNDS shifter positions 88, 90, 92 and 94, respectively, and intermediate positioned pipe 82 denotes bi-directional movement arrow 96), as best shown in FIG. 2. Each of the light pipes 76, 78, 80, 82, 84 and 86 are supported within the package housing so that bottom open ends are in communication with individual pairs of LED's integrated into the PCB board 54 (these including in FIG. 9 as shown at 98/100 for center Park light pipe 76, 102/104 for Reverse light pipe 78, 106/108 for Neutral light pipe 80, 110/112 for bi-directional arrow 96, 114/116 for Drive light pipe 84, and 118/120 for Sport light pipe 86). Pairing of LED's provides one each for backlighting and gear indication respectively. Reference is also made to the illuminating RNDS and intermediate arrow locations formed into the top bezel cover 14 in FIG. 2.

Figure 5:
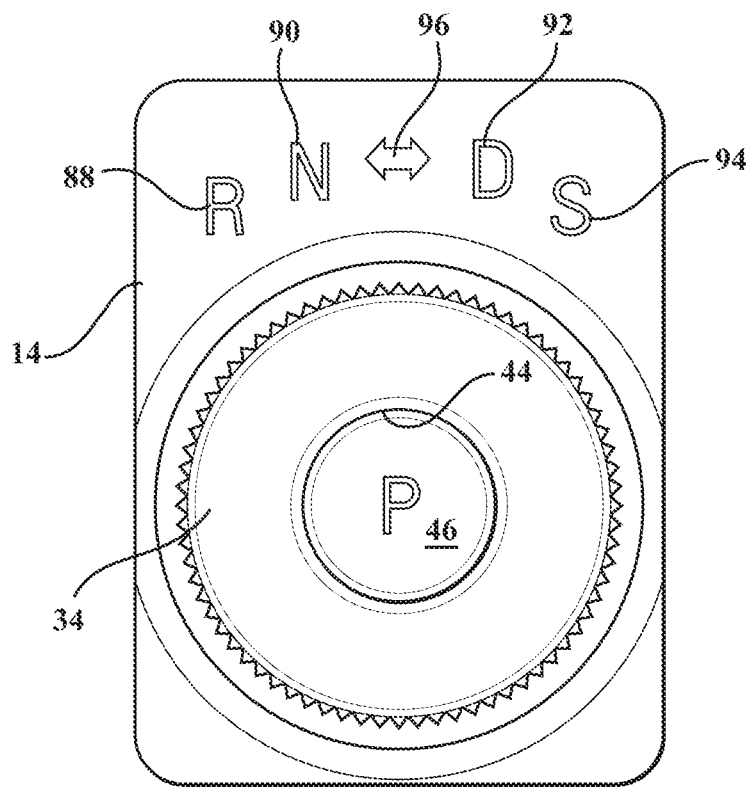
FIGS. 5-8 are a collection of plan, perspective, side and end views respectively of a monostable rotary shifter according to one non-limiting variant of the present invention and depicting a rotary knob which can shift between each of Park, Reverse, Neutral, Drive and Sport positions (the latter providing higher RPM at lower speeds for such as performance driving conditions), the Park position further being provided as a central push button configured within the rotary knob which is selectively rotatable to the other positions.

The center Park position light pipe 76 extends through the interior of the Park button 46 and connected push rod 52, with the outer positioned light pipes 78-86 further communicating with surface position indicators for each of the outer fixed shifter RNDS and bi-directional arrow positions (see as again best shown in FIG. 5).

In this fashion, and once rotated to one of the RNDS positions and confirmed by LED indication, the knob is automatically returned to the center position by itself (again via the proximity sensor built into the PCB 54 for determining proximal vertical displacement of the conductive pads in the direction of the PCB). As further explained in the supporting disclosure, the present design differs in respects from known monostable lever shifters in that it includes the push to return Park button which substitutes for Park lock or return to Park features required in prior art designs. The return to center feature further makes gear selection easier with embedded software in the present design verifies the selected gear positions to meet the current vehicle position.

Figure 6:
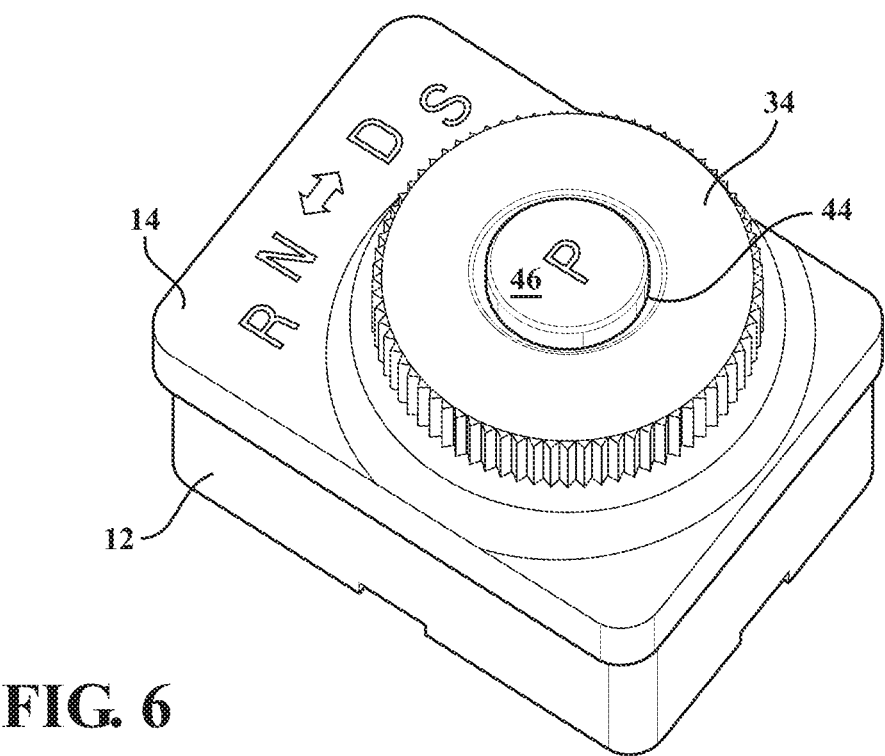

As further shown in FIG. 6, a rear rotated perspective of the rotary shifter assembly is depicted and includes the bezel cover 14, rotary knob stem 36 and S position lock ring 40. The bezel underside exhibits circumferentially arrayed blocking abutments or locations, three of which are visible at 122, 124 and 126. The Sport position lock ring 40 further includes peripheral projecting tabs, three of which are evident at 128, 130 and 132, which are arranged in offset manner relative to said blocking locations and which prevent rotation of the knob into the S gear without first depressing the knob downwardly in order to vertically unseat the ring 40 and its tabs 128, 130 and 132 from rotationally induced abutment with the underside bezel blocking locations 122, 124 and 126.

Figure 7:
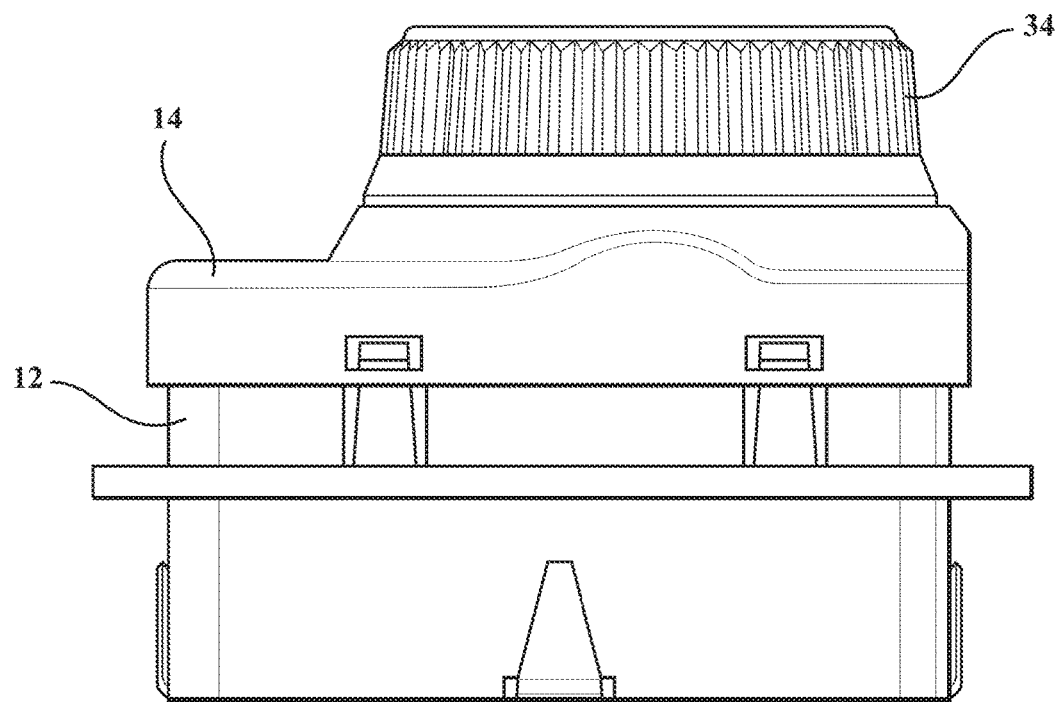
Figure 8:
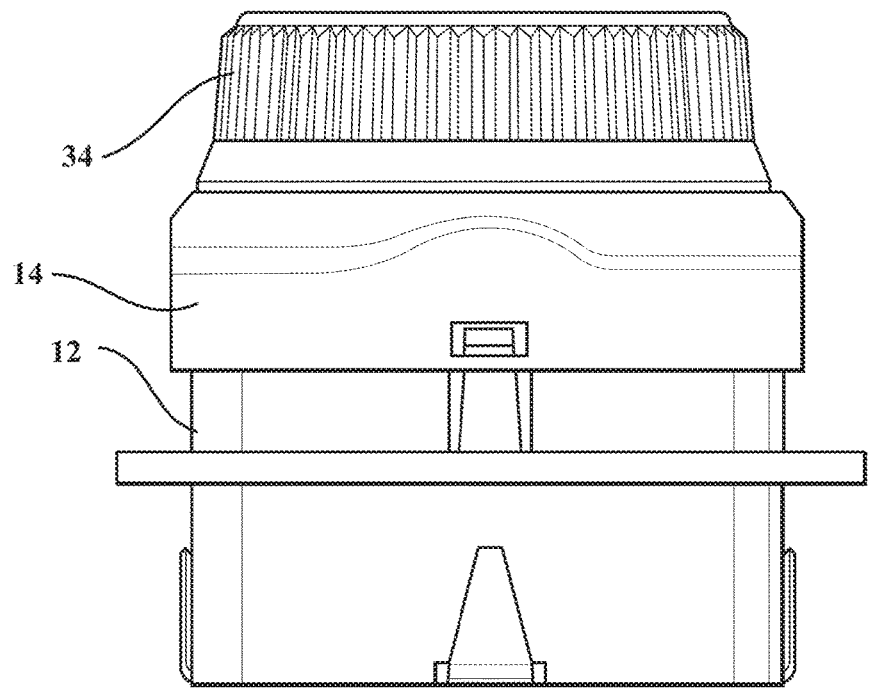

FIG. 7 is a perspective view of a portion of the subassembly and including the rotary knob 34 with S lock ring 40 affixed thereto (see as keyed to recessed locations in knob stem 36). A coil spring 42 is depicted positioned underneath the plunger housing locker 38 for biasing the knob 34 upwardly to maintain the rotational engagement between the bezel underside blocking locations 122, 124 and 126 and the S position lock ring tabs 128, 130 and 132. Accordingly, and in order to prevent the shifter from unintentionally going into the S gear, the Park position button must be first pushed downwardly to vertically unseat the lock ring tabs from the bezel blocking positions, the knob subsequently being rotated to the S position 94.

Figure 15:
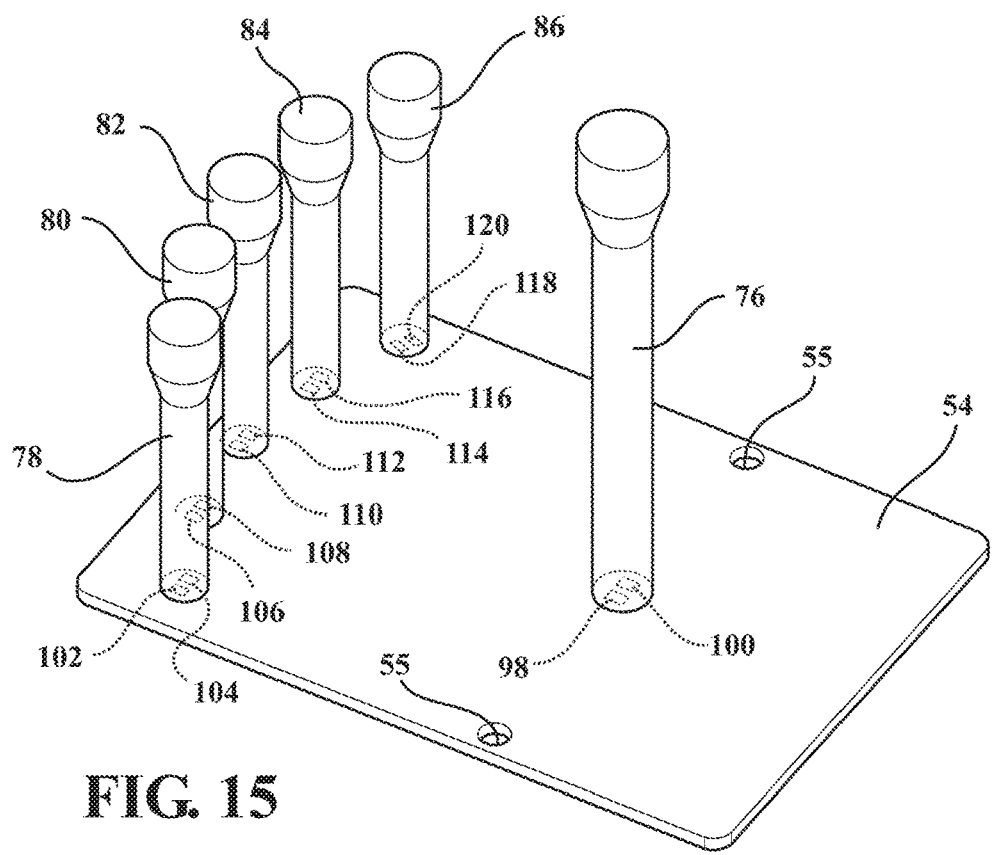
FIG. 15 is a succeeding view to FIG. 6 depicting the arrangement of light pipes in combination with a sensor and LED supporting printed circuit (PCB) board, the LED elements being provided in respective pairs for providing both back lighting and gear indication for each shifter position.
Figure 16:
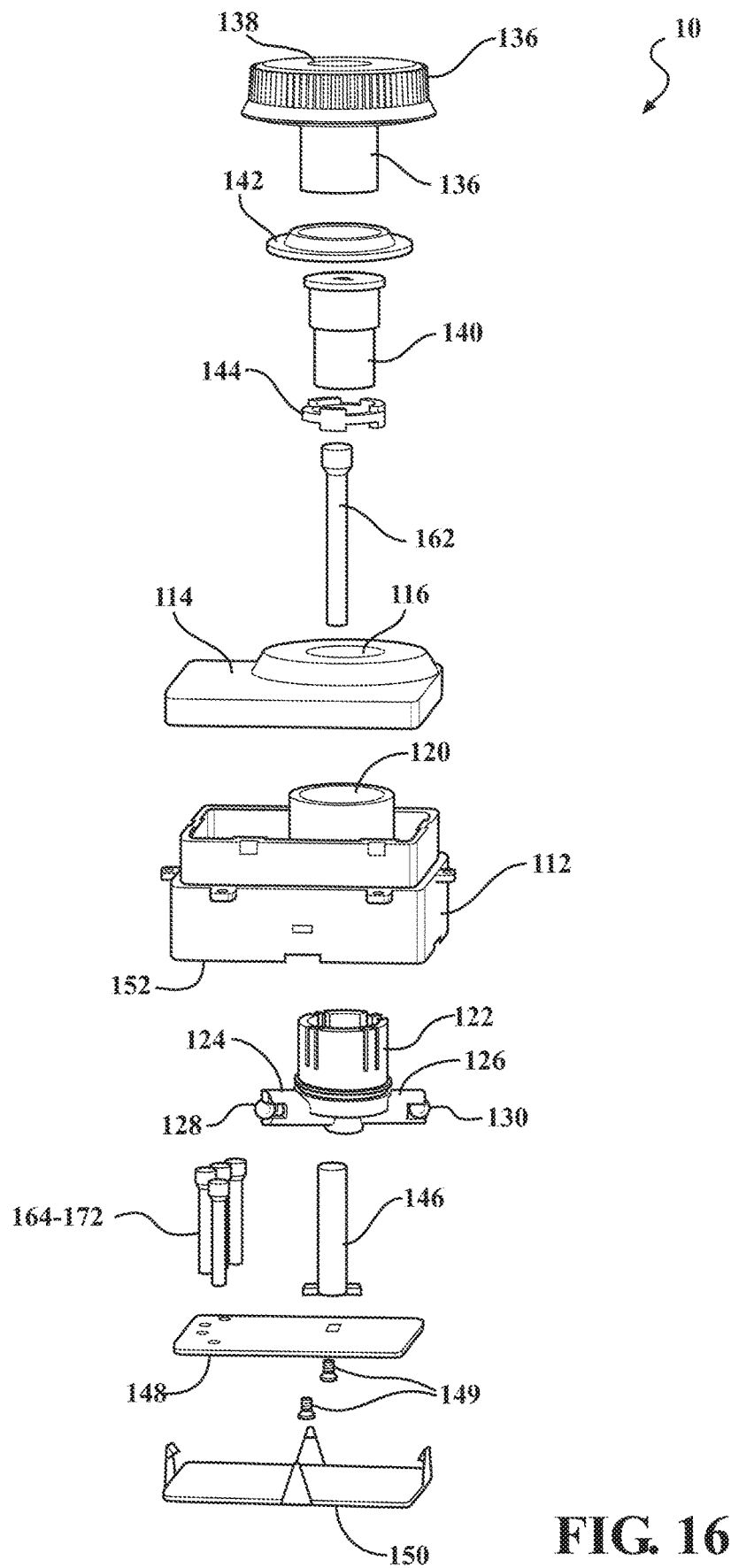
FIG. 16 is an exploded view of a rotary shifter package according to a further non-limiting variant of the present invention.
Figure 17:
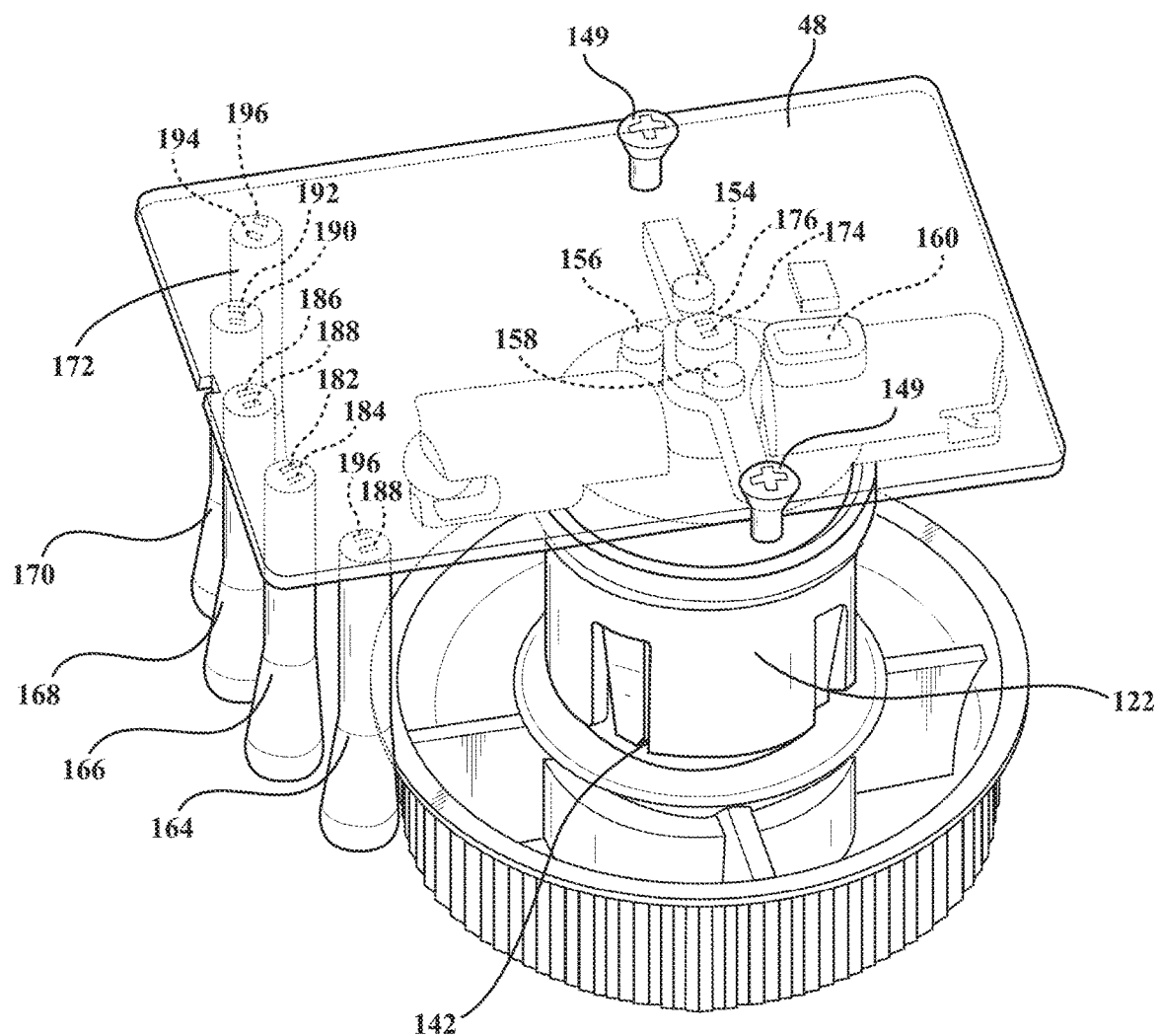
FIG. 17 is an inverted and underside perspective of the internal components of the rotary shifter according to FIG. 16, without the outer package housing and bezel cover, and further illustrating an arrangement of conductor pads which are downwardly displaced upon pressing of the Park button subassembly to ensure outputting of a switch signal confirming a return to center Park condition, an underside of the plunger housing also integrating a magnet which, upon rotating the housing, adjusts a magnetic field sensed by a position sensor within the PCB board, such as which is understood further to be any suitable type of inductive or magnetic Hall effect sensor, in order to detect a rotated knob position.

With further reference to FIGS. 16-17, a pair of respective exploded and underside partial phantom perspective views are shown, see generally at 100 in FIG. 16, of a monostable rotary shifter according to a further variant. Much of the description of FIGS. 16-17 replicates features shown in the initial variant of FIGS. 5-15 and, consequently, description of this embodiment will be directed to the features which differ from that of the initial embodiment.

A rotary knob 134 is again provided includes an underside collar 136 affixing within an open upper rim interior of a plunger housing 122. Upon a bezel cover 114 being mounted atop a main packaging housing 112, and the plunger housing 122 being mounted through a bezel cover opening 116 and a further opening 120 associated with the main package housing 112 (with the knob 134 underside ledge surrounding the collar 136 supported upon the annular rim of the bezel cover 114 surrounding the opening 116), a pair radial projecting portions 124/126 associated with the plunger housing 122 align with the inwardly facing detent profile (see as previously referenced at 18 in FIG. 11 associated with the underside of the main housing).

The outwardly spring influenced steel balls, shown in FIG. 16 at 128/130 are supported within the open interior of the radial portions 124/126 and interact in tactile induced fashion with the detent profile edges 18 (see again as previously shown in FIG. 11) defined within the inner rim surface of the package housing to establish guided rotation of the knob 134 relative thereto. In this manner, the configuration of the detent profile further provides a clear tactile/haptic feel of a given shift position and, as will be described, further ensures that the knob will be returned to center at all gear positions.

The rotary knob 134 in FIG. 16 further includes an annular open rim 138 which receives a Park (push) button 140, this including a generally elongated cylindrical body with an upper end surface aligning generally with the upper knob surface. A knob seal 142 (compared to what is depicted in 48 in the first variant and as further shown in the underside perspective of FIG. 17) provides support between the underside interface between the rotary knob collar 136 and the receiving profile of the plunger housing 122.

A Park button seal 144 is provided for communicating the Park button 140 with a further Park button push rod 146, thereby enabling collective vertical displacement of the linked Park button 140 and push rod 146 relative to the plunger housing 122, such that depressing of the button 140 allows for relative vertical displacement of the push rod 146 and in a direction towards an underneath located printed circuit (PCB) board 148. As further shown, the PCB 148 is located at the generally bottom of the package interior, secured by screws 149 with a bottom cover 150 supported underneath the PCB 148 (again via aligning pairs of apertures defined in the PCB and the bottom cover), this in turn mating with an underside outer rectangular rim edge 152 of the main housing 112. As further best previously shown in FIG. 11, the outer package housing can include peripheral mounting tabs or portions (previously depicted at 62, 64, 66, 68 et seq.) for mounting the overall assembly within a vehicle environment.

As best shown in FIG. 17, a plurality of conductive pads 154, 156 and 158 are secured to an underside of the park position push 146 such that, upon depressing the Park button 140 (and by connection the Park position push rod 146), the pads contact the PCB 148 to instruct the generation of a switch signal for the shifter to the Park position. An underside of the plunger housing 122 also integrates a magnet 160 (see FIG. 17) which, upon rotating the housing 122 relative to the main package housing 112 and as guided by the internal detent profile (again as depicted in FIG. 11 at 18), adjusts a magnetic field sensed by a position sensor within the PCB board 148 (such as which is understood further to be any suitable type of inductive or magnetic Hall effect sensor) in order to detect a rotated knob position.

A plurality of light pipes are provided and include each of a center Park position light pipe 162 (FIG. 10) and a plurality of RNDS light pipes (see collectively at 164, 166, 168, 170 and 172). Each of the light pipes 164, 166, 168, 170 and 172 are supported within the package housing so that bottom open ends are in communication with individual pairs of LED's integrated into the PCB board 148 (these including as shown in FIG. 11 at 174/176 for center Park light pipe 162, 178/180 for light pipe 164, 182/184 for light pipe 166, 186/188 for light pipe 168, 190/192 for light pipe 170, and 194/196 for light pipe 172). Pairing of LED's provides one each for backlighting and gear indication respectively. Reference is also made to the illuminating RNDS locations, see at 88, 90, 92 and 94 formed into the top bezel cover also at 14 in FIG. 2.

The center Park position light pipe 162 extends through the interior of the Park button 140 and connected push rod 146, with the outer positioned light pipes 164, 166, 168, 170 and 172 further communicating with surface position indicators for each of the outer fixed shifter RNDS positions (see again as best shown in FIG. 2).

The arrangement of light pipes in combination with a sensor and LED supporting printed circuit (PCB) board are again referenced from FIG. 15 in the first variant 10, with the LED elements being provided in respective pairs for providing both back lighting and gear indication for each shifter position. FIG. 17 further best depicts an inverted and underside perspective of the internal components of the rotary shifter, without the outer package housing and bezel cover, and further illustrating an arrangement of conductive pads which are downwardly displaced upon pressing of the Park button subassembly to ensure outputting of a switch signal confirming a return to center Park condition.

In this fashion, and once rotated to one of the RNDS positions and confirmed by LED indication, the knob is automatically returned to the center position by itself (again via the proximity sensor built into the PCB 148 for determining proximal vertical displacement of the conductive pads in the direction of the PCB 148). As further explained in the supporting disclosure, the present design differs in respects from known monostable lever shifters in that it includes the push to return Park button which substitutes for Park lock or return to Park features required in prior art designs. The return to center feature further makes gear selection easier with embedded software in the present design verifies the selected gear positions to meet the current vehicle position.

Having described my invention, other and additional embodiments will become apparent to those skilled in the art to which it pertains, and without deviating from the scope of the appended claims:

We claim:

1. A rotary shifter, comprising:
   a housing with a bezel cover;
   a knob rotatably secured to said housing via a plunger housing subassembly and selectively rotatable between each of Reverse, Neutral, Drive and Sport positions;
   a park button configured within a downwardly extending stem of said knob and, upon depressing, communicating via a park button push rod with a sensor and switch within said housing for establishing the Park position;
   said bezel cover further having an annular opening defining an underside surface and through which projects said stem and park button, a plurality of circumferential blocking abutments projecting from said underside surface of said bezel cover in proximity to said annular opening; and
   a Sport position lock ring secured to said stem of said knob, said lock ring being in a normally biasing engagement against an underside of said bezel cover to prevent shifting to a Sport position, said lock ring having a circumferential array of peripheral projecting tabs which are offset from said blocking abutments and which prevent rotation of said lock ring, said knob being vertically depressed in a counter direction to said bias in order to vertically unseat said lock ring downwardly away from said bezel cover to permit subsequent rotation to the Sport position.

2. The shifter as described in claim 1, further comprising a Sport position spring supporting an underside of a plunger housing locker forming a portion of said plunger housing subassembly.

3. The rotary shifter as described in claim 2, further comprising an inner aperture defining a rim edge incorporated into a main package defining portion of said housing.

4. The rotary shifter as described in claim 3, further comprising said plunger housing subassembly and plunger housing locker collectively defining a cylindrical shape to which is secured said knob, said plunger housing subassembly having a pair of lower and opposite and radial projecting guiding portions, these being interiorly hollowed for receiving a pair of opposing steel balls and supporting detent springs.

5. The rotary shifter as described in claim 3, further comprising said stem of said knob affixing within an open upper rim interior of said plunger housing subassembly, which is mounted through said bezel cover annular opening and a further recessed opening in said main package defining housing so that said radial projecting guiding portions align with said rim edge, said steel balls supported within said open interior of said radial projecting guiding portions interacting with said rim edge for providing guided rotation of said knob.

6. The rotary shifter as described in claim 3, said knob further comprising an annular rim receiving said park button, said park button including a generally elongated cylindrical body with an upper end surface aligning with an upper surface of said knob.

7. The rotary shifter as described in claim 6, further comprising a knob seal providing support between an underside interface between said knob and a receiving profile of said plunger housing subassembly.

8. The rotary shifter as described in claim 7, further comprising a park button seal communicating said park button with said park button push rod, enabling vertical displacement of said park button and push rod relative to said plunger housing in a direction towards an underneath located printed circuit board (PCB) within said housing.

9. The rotary shifter as described in claim 8, further comprising a plurality of conductive pads proximate an end of said park button push rod, depressing said park button and park button push rod, causing said pads to contact said PCB to shift to the Park position.

10. The rotary shifter as described in claim 9, further comprising a magnet located at an underside of said plunger housing subassembly which, upon rotating said plunger housing subassembly relative to said main package housing, adjusts a magnetic field sensed by a position sensor within said PCB board in order to detect a rotated knob position.

11. The rotary shifter as described in claim 10, further comprising a Park position light pipe, a separate plurality of shifter position light pipes being arranged within said housing so that bottom open ends of each of said light pipes are in communication with LED's integrated into said PCB board.

12. The rotary shifter as described in claim 11, said LED's further comprising pairs of LED's for providing each of backlighting and gear indication respectively for each shifter position.

* * * * *